No. 791,072. PATENTED MAY 30, 1905.
N. C. BRADLEY.
SHAVING SOAP STICK HOLDER.
APPLICATION FILED MAY 2, 1904.
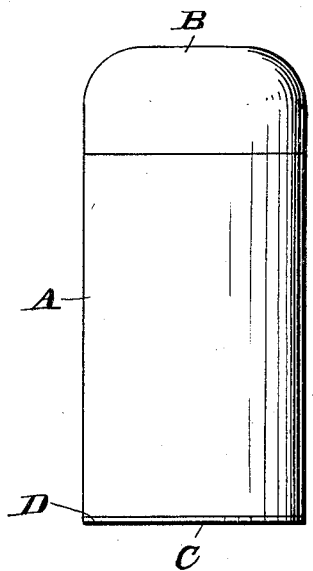
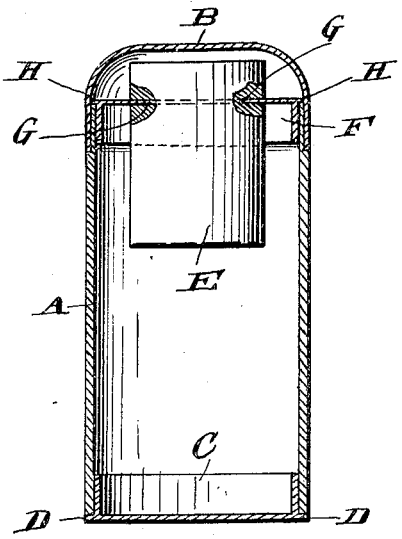
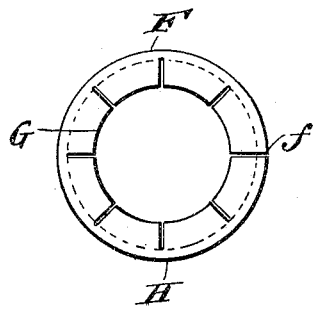

No. 791,072. Patented May 30, 1905.

UNITED STATES PATENT OFFICE.

NEWELL CHARLES BRADLEY, OF PHILADELPHIA, PENNSYLVANIA.

SHAVING-SOAP-STICK HOLDER.

SPECIFICATION forming part of Letters Patent No. 791,072, dated May 30, 1905.

Application filed May 2, 1904. Serial No. 206,024.

*To all whom it may concern:*

Be it known that I, NEWELL CHARLES BRADLEY, a citizen of the United States, residing at Philadelphia, in the county of Philadelphia and State of Pennsylvania, have invented certain new and useful Improvements in Shaving-Soap-Stick Holders, of which the following is a specification.

My invention relates to devices for securing a stick of shaving-soap in a suitable box or casing, and has for its object the provision of simple means for clamping the soap in the casing and means for raising the surface of the stick out of the casing as it is worn down by use.

The shaving-sticks as at present manufactured are cylindrical in shape and are sold in cylindrical casings of cardboard or other suitable material. In using the stick it is removed from the casing and after use replaced therein. The objection to this form is that the fingers are gummed with the soap, while when the soap is replaced in the box it is apt to be sticky and before used again becomes fastened in the casing or box.

In my invention the end of the stick is held above the level of the top of the box or casing by means of a ring made of metal or other suitable material that has an edge adapted to bite into the soap, while its periphery clamps the inner side of the casing to hold the stick therein. By this construction the fingers do not contact with the soap, while the ring serves to prevent the soap inside of the casing from getting moistened.

The construction and advantages of my invention will fully appear hereinafter and by reference to the accompanying drawings, in which—

Figure 1 is a view in elevation of a soap-stick holder embodying my invention; Fig. 2, a vertical sectional view, and Fig. 3 a top view, of the soap-stick clamp.

Referring to the drawings, in which similar reference characters indicate corresponding parts throughout the several views, A represents a tubular casing, which may have its exterior decorated as desired. At one end of the casing A the exterior is reduced to receive a top B, which may also be embellished by an ornate design.

C represents the bottom, consisting of a disk in diameter equal to the largest diameter of the casing A and having an annular flange D secured thereto to snugly fit the inner side of the casing A.

E represents the soap-stick, and F the clamping-ring for holding it in the upper end of casing A. The ring F is preferably made of metal and is formed with a break $f$, the two edges of the break being normally sprung apart. The upper part of the clamping-ring F has an inwardly-extending biting edge G, that cuts into the side of the soap-stick E. As shown in the drawings, the clamping-ring F is adapted to seat in the top of casing A, H being an outwardly-extending flange to seat on the top edge of the casing and prevent the soap and clamping-ring from slipping into the casing.

It will be readily apparent that my invention is applicable to use with any cylindrical stick of soap and that it may be sold with a stick of soap, the casing being used for the box, or the stick-holder may be sold as a separate toilet article, the parts being made as ornamental as desired and of any material, including the precious metals, preferred. It will be also understood that as the soap-stick is worn off by use the clamping-ring F is moved toward its unused end, and that the clamping-ring holds the stick away from the inner side and the bottom of casing A and prevents it from sticking thereto, and that the ring also prevents the moisture getting inside of the casing.

Having thus described my invention, what I claim is—

1. In a shaving-stick holder, a tubular casing, and a ring provided with means to pierce the shaving-stick, and an outwardly-extending flange on said ring to seat on the edge of said tubular casing, substantially as shown and described.

2. In a shaving-stick holder, a tubular casing, and a broken ring having an inwardly-extending biting edge to penetrate the stick, and an outwardly-extending flange to seat on the top edge of the casing, substantially as shown and described.

3. In a shaving-stick holder, a tubular casing, a bottom comprising a disk and an annular flange to seat inside of said casing, a top to fit the outer surface of said casing, and a clamp comprising a broken ring, an inwardly-extending edge to bite the soap, and an outwardly-extending flange to seat on the edge of said tubular casing, substantially as shown and described.

In testimony whereof I hereto affix my signature in the presence of two witnesses.

NEWELL CHARLES BRADLEY.

Witnesses:
OLIVER DICKERSON,
JOSEPH ENTWISLE.